United States Patent [19]

Lanik

[11] 4,238,752

[45] Dec. 9, 1980

[54] MAGNETIZING DEVICE

[75] Inventor: Hans Lanik, Traiskirchen, Austria

[73] Assignee: EVVA Werk Spezialerzeugung von Zylinder- und Sicherheitsschloessern Gesellschaft m.b.H. & Co., Vienna, Austria

[21] Appl. No.: 894,849

[22] Filed: Apr. 10, 1978

[30] Foreign Application Priority Data

| | | | |
|---|---|---|---|
| Apr. 13, 1977 | [AT] | Austria | 2549/77 |
| Jul. 27, 1977 | [AT] | Austria | 5494/77 |
| Jul. 27, 1977 | [AT] | Austria | 5497/77 |

[51] Int. Cl.[3] .............................................. H01G 27/28

[52] U.S. Cl. ...................................... 336/73; 335/284; 336/82; 336/84 C; 336/223; 360/123

[58] Field of Search ........................ 335/284; 361/143; 334/85; 360/123, 122, 129; 336/82, 84 C, 223, 73

[56] References Cited

U.S. PATENT DOCUMENTS

| | | | |
|---|---|---|---|
| 2,655,623 | 10/1953 | Parker | 336/82 |
| 2,658,114 | 11/1953 | Buhrendorf | 360/123 |
| 2,677,019 | 4/1954 | Buhrendorf | 360/123 X |
| 2,838,614 | 6/1958 | Ashby et al. | 360/123 X |
| 2,868,889 | 1/1959 | Patterson | 360/129 X |
| 2,901,714 | 8/1959 | Baker | 336/82 |
| 3,353,130 | 11/1967 | Silverstein | 336/82 |
| 3,626,344 | 12/1971 | Shaternikov et al. | 336/84 C |
| 3,758,727 | 9/1973 | Kruklitis | 360/122 X |

*Primary Examiner*—Thomas J. Kozma
*Attorney, Agent, or Firm*—Michael J. Striker

[57] ABSTRACT

A magnetic transformer device includes a cylindrical transformer core, a first winding surrounding the core and a second winding surrounding the first winding. The second winding is formed as a ring-like element with a slot on its upper surface and has a portion located within this slot and extending beyond the upper surface of the second winding. This portion is formed with a cross-section of a size substantially smaller than the size of the slot to produce a magnetic field of high density.

10 Claims, 8 Drawing Figures

MAGNETIZING DEVICE

BACKGROUND OF THE INVENTION

The invention relates to a device which comprises a transformer for magnetizing the surface of material of high magnetic resistance.

According to prior art there are known such devices for materials of low magnetic resistance for which however an iron yoke is used as conductor of the magnetic flux. Thereby the strength of the magnetic fields is limited to $1.6\times10^6$ A/m. This value can be raised by using the stray flux of the field inducing coil.

SUMMARY OF THE INVENTION

It is therefore an object of the invention to achieve a strength of the magnetic field on the surface of the material to be magnetized which is about three times higher whereby the stray and foreign fields are screened out. According to the present invention these objects are attained thereby that the secondary winding of the transformer is provided with one or more portions of reduced cross sectional area in order to produce a magnetic field of high density for the magnetization. These portions are positioned within a slot formed in a ring-like second winding and made to extend beyond the upper surface of the ring-like second winding.

BRIEF DESCRIPTION OF THE DRAWINGS

In the following some embodiments of the invention are described with reference to the drawings by way of example only.

DETAILED DESCRIPTION OF THE INVENTION

Figure 1:
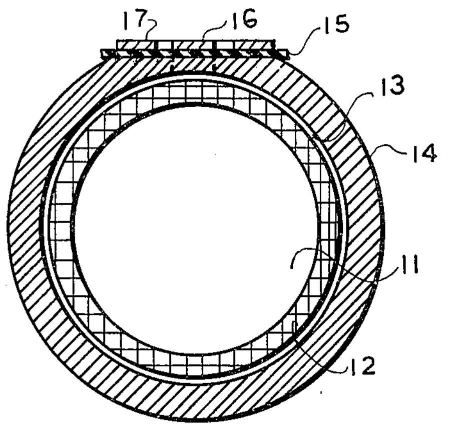
FIG. 1 is a section taken along line I—I of FIG. 2 of the device according to the invention.
Figure 2:
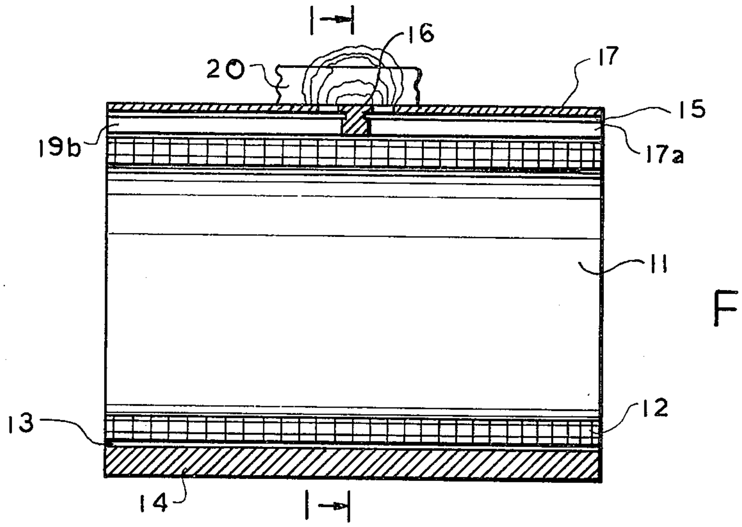
FIG. 2 is a cross section of FIG. 3 a view of the top of the embodiment according to FIG. 1.
Figure 3:
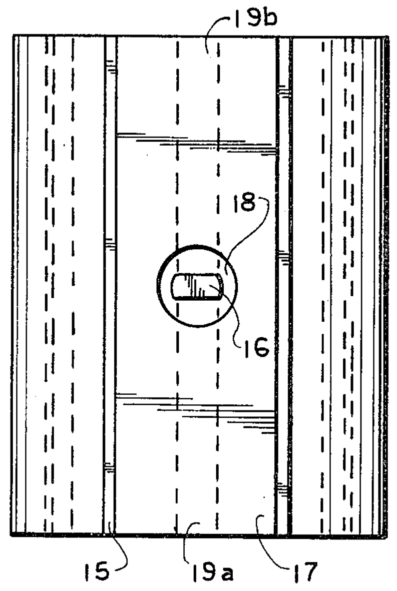

In the FIG. 1, 2, 3 there is shown a first embodiment of the invention comprising a pulse transformer including a core 11, a first winding 12 and a secondary winding 14 which is 9 metal ring provided with a portion 16. Two slots 19*a* and 19*b* are formed on the upper surface of ring 14 where portion 16 is located. A strong magnetic field shown in FIG. 2 is induced in a small area. A material 20 to be magnetized is placed on this portion 16 where the surface of the working part is magnetized. The metal ring 14 is slit nearly over its complete axial extension and the winding 14 is completed only by the portion 16 whereby current is concentrated on the narrow portion 16, and the strong magnetic field is induced around portion 16. When magnetizing, the primary coil 12 is charged with a very short current pulse. This current pulse induces a magnetic field with a very high frequency which can be screened out by a copper foil 17 beside the area which is defined by an aperture 18 in the copper foil 17. In order to prevent a short circuit of the field induced by portion 16, the screening foil 17 is electrically separated from the secondary winding by an insulating layer 15. Moreover the foil strengthens the magnetic field within the aperture.

Between the primary winding 12 and secondary winding 14 there is placed a further insulating layer 13 for insulation reasons. As a result of the special geometry of the arrangement and because of suppression of the magnetic stray flux high efficiency is achieved.

Figure 4:
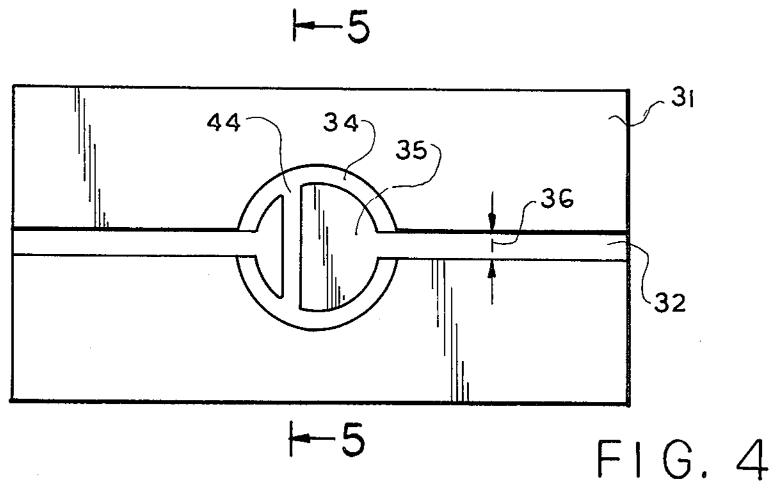
FIG. 4 is a view of another embodiment and FIG. 5 is a cross section along line V—V of FIG. 4.
Figure 5:
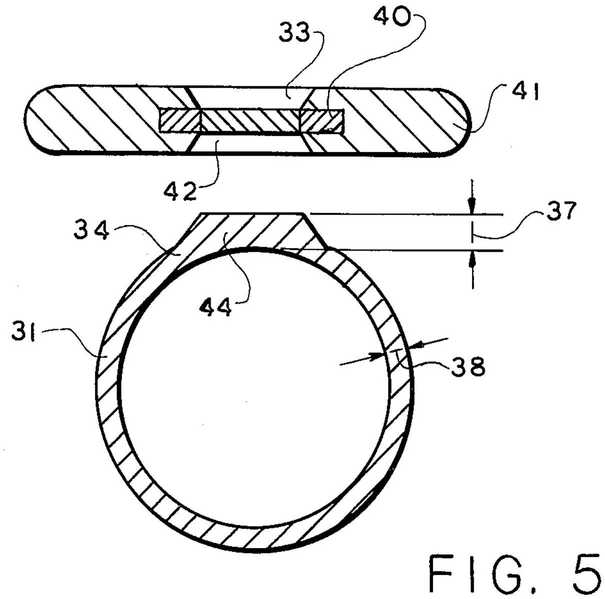
Figure 6:
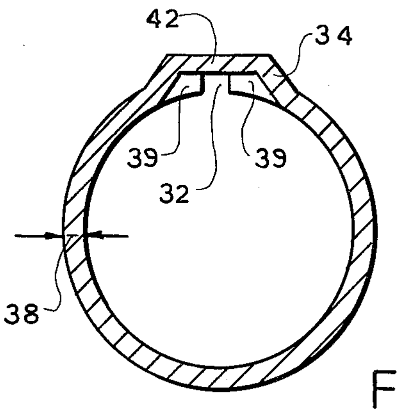
FIG. 6 shows the same cross sectional view of a further embodiment.

In FIGS. 4 to 6 showing a second embodiment of the invention it can be seen that a magnetizing head 31 is formed like a tube (sleeve) provided with a longitudinal slot 32. This longitudinal slot is comparatively narrow. The magnetizing tube comprises a head portion 34. This head portion 34 comprises an central opening 35 bridged by a bar 44. The diameter of the aperture 35 is much larger than the width of said slot 32. As mentioned above FIG. 5 shows a cross section through this tube 31 and the bar 44. The bar 44 in this embodiment is of greater thickness than a wall thickness 38 of the tube 31.

As can be understood from FIG. 5 the magnetizing head 31 is placed on the pill 33 arranged in a key 40 for magnetization. The key is inserted in a ring-like socket 41. The head portion 34 of the magnetizing head 31 is formed like a truncated cone and fits exactly with a cut out 42 of said ring-like socket 41 working as a short circuite ring. Thereby the pill 33 to be magnetized is directly exposed to the effective magnetic field of the magnetizing head 31. The stray fields are absorbed by said short circuite ring.

In a further embodiment according to FIG. 6 the bar 44 continues with a thickness which is equal to the thickness 38 of the wall. On the underside of the bar 44 there are arranged cut outs 39.

In this embodiment the bar 44 is excentrically arranged. Thereby a wanted asymmetric magnetization of the pill is achieved without the necessity to displace the complete magnetizing head. Because of this construction of the head portion 34 a favourable arrangement of the flow of the current is achieved whereby the magnetic field in the opening 35 is strengthened. The magnetic field outside of this opening 35 is weakened. Thereby a magnetization of the pill 33 takes place which actually is as high as possible whereby no disturbing stray fields can affect the magnetization of adjacent pills of the key 40.

The invention is not limited to the embodiment as shown in the figures. It is within the knowledge of a person skilled in art to choose a favourable form of the head portion 34 depending on the wanted kind of magnetization of a pill. Thus, the bar 44 may be formed as a rectilinear element but also may be curved in some way. Eventually it might be necessary in some cases to provide a centrical arrangement of this bar.

As a matter of example only it is mentioned that normally the magnetizing head according to the invention might show the following dimensioning: Thickness of the wall 38 between 0.2 and 10 mm, width 36 of the slot 32 between 0.2 and 2 mm, thickness 37 of the bar 44 between 0.2 and 10 mm, diameter of the opening 35 between 1 and 30 mm.

In particular the magnetizing head as described above can be used in the device which was described in the beginning of the specification, in which the magnetizing device for magnetizing surfaces is provided as pulse transformer and whereby the secondary winding is definded by the magnetizing head 31.

Figure 7:
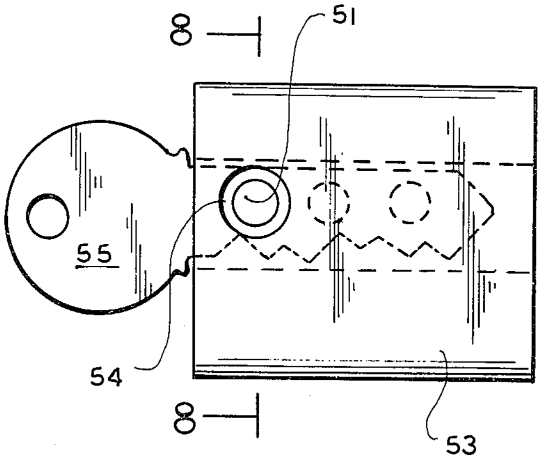
In FIG. 7 is shown the screening socket with a magnet key inserted.
Figure 8:
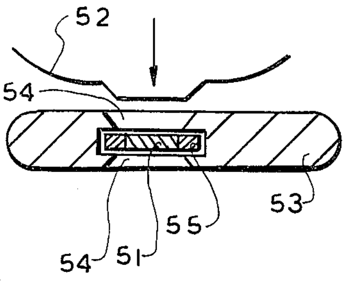
FIG. 8 is a cross section along line VIII—VII of FIG. 7.

In the FIG. 7 and 8 the pill to be magnetized is designated as 51 which pill is fixed in a key 55. For magnetization of this pill 51 the key 55 is inserted into a socket 53 as can be learned from FIG. 8 too. The pill 51 is placed in the socket 53 such that the pill is situated in an aperture 54 formed in socket 53 so that a magnetizing head 52 (and/or a second one from the other side of the socket) can be lead near to the pill. The magnetizing head 52 is shaped in it's leading portion such that it fits with the shape of the aperture 54. In the drawing both parts show a cone like cross section. After the leading portion of the magnetizing head 52 is brought to the pill it fits exactly with the aperture 54. Therefore the pill 51 is exposed directly to the effective magnetic field whereby stray fields are absorbed by the socket 53 which is a good conductor for electricity. The socket has the effect of a short circuit ring. It is favourable if the socket 53 is made of copper and as a one-piece element. Because of the absorbtion of an eventual stray field there is no danger that other pills adjacent to the first pill 51 will become premagnetized or that pills already magnetized will become influenced in their magnetic property.

The effect of the socket is also similar to the effect of a Faraday screen.

In particular the invention is of advantage for ironless magnetizing devices for induction of more than 2 Tesla. The thickness of the socket should measure between 0.2 and 10 mm so that the skin effect will actually be effective. Furthermore, this magnetizing device is particularly suitable for magnetization by short pulses of preferably about 20$\mu$ sec. depending on the geometric conditions.

The invention is not limited to the embodiments mentioned above. Furthermore, the invention can be applied in all cases in which it is necessary to press a very exact magnetization upon a body to be magnetized. Furthermore, it is emphasized that it is of advantage to use this screening device together with the magnetizing device mentioned above.

I claim:

1. A magnetic transformer device comprising: a cylindrical transformer core; a first winding surrounding said core and a second winding surrounding said first winding, said second winding being formed as a ring-like element with a slot on the upper surface thereof and having at least one portion located within said slot and extending beyond said upper surface, said portion being formed with a cross-section of the size substantially lower than that of said slot to produce a magnetic field of high density for magnetizing a magnet material.

2. The magnetic transformer device of claim 1, wherein said second winding is a metal tube having said portion formed integral therewith.

3. The magnetic transformer head of claim 1, further comprising a screen element arranged above said portion, said screen element is formed with a through passing aperture to limit the area to be magnetized.

4. The magnetic transformer device of claim 3, wherein an insulating element is placed between said screen element and said second winding.

5. The magnetic transformer of claim 2, wherein said slot is axially projecting along the whole length of said metal tube.

6. The magnetic transformer device of claim 2, wherein said slot is formed with a central opening with the width exceeding the width of said slot, and said portion of said metal tube is a bar bridging element positioned across said opening.

7. The magnetic transformer device of claim 6, wherein said opening is a circular aperture and said bar bridging element is positioned excentrically across said aperture.

8. The magnetic transformer device of claim 6, wherein said bar bridging element has a thickness exceeding the thickness of said metal tube.

9. The magnetic transformer device of claim 6, wherein said bar bridging element has a thickness equal to the thickness of said metal tube.

10. The magnetic transformer device of claim 2, wherein said portion of said metal tube is shaped as a truncated cone.

* * * * *

UNITED STATES PATENT AND TRADEMARK OFFICE

CERTIFICATE OF CORRECTION

PATENT NO. : 4,238,752

DATED : December 9, 1980

INVENTOR(S) : Hans Lanik

It is certified that error appears in the above-identified patent and that said Letters Patent are hereby corrected as shown below:

In the heading, the name of the Assignee should read

-- EVVA-Werk Spezialerzeugung von Zylinder- und Sicherheitsschloessern Gesellschaft m.b.H. & Co. Kommanditgesellschaft --.

Signed and Sealed this

*Twenty-fourth* Day of *March 1981*

[SEAL]

*Attest:*

RENE D. TEGTMEYER

*Attesting Officer* *Acting Commissioner of Patents and Trademarks*